United States Patent [19]

Wells et al.

[11] Patent Number: 4,635,024
[45] Date of Patent: Jan. 6, 1987

[54] WELDING METHOD AND THERMOSTAT PRODUCED

[76] Inventors: Robert M. Wells, 4371 Ira Rd., Akron, Ohio 44313; Alton R. Wells, 4573 W. Trade Winds Ave., Lauderdale-by-the-Sea, Fla. 33308

[21] Appl. No.: 642,517

[22] Filed: Aug. 20, 1984

Related U.S. Application Data

[62] Division of Ser. No. 419,774, Sep. 20, 1982, Pat. No. 4,489,228.

[51] Int. Cl.$^4$ .................. H01H 37/52; H01H 37/64
[52] U.S. Cl. .................. 337/373; 200/279; 219/119; 29/879; 335/196; 337/329
[58] Field of Search ........ 200/275, 279; 337/373, 337/329, 109, 112; 335/196; 219/78.16, 91.23, 93, 119; 228/179; 339/275; 29/522, 509, 622, 879

[56] References Cited

U.S. PATENT DOCUMENTS

| | | | |
|---|---|---|---|
| 896,218 | 8/1908 | Lachman | 219/119 |
| 1,229,700 | 6/1917 | Auel | 219/93 |
| 1,261,943 | 4/1918 | Lashar | 219/91.23 |
| 3,386,066 | 5/1968 | Audette | 337/365 |
| 3,721,934 | 3/1973 | Wells | 337/112 |
| 4,400,608 | 8/1983 | Wagatsuma et al. | 219/119 |

FOREIGN PATENT DOCUMENTS 1040358 10/1953 France ................ 200/279

*Primary Examiner*—Harold Broome
*Attorney, Agent, or Firm*—Oldham, Oldham & Weber

[57] ABSTRACT

A method of welding electrical contacts onto conductive bodies including engaging a surface of the contact with the conductive body and passing a welding current through a pair of spaced surface areas of the contact to provide weld action and wherein a rib portion between the pair of spaced areas retains unoxidized metal thereon to improve electrical contact properties of any article made and utilizing the contact and particularly the ribbed area thereof for make and break engagement with other members of an electric circuit.

A new control article is also provided wherein a contact therein has a raised center rib thereon for contacting an associated means for make and break circuit action, which contact is made from silver or silver alloy and has uncontaminated silver on the surface of the rib or center area of the contact.

2 Claims, 12 Drawing Figures

WELDING METHOD AND THERMOSTAT PRODUCED

This is a division of application Ser. No. 419,774, filed Sept. 20, 1982, now U.S. Pat. No. 4,489,228.

TECHNICAL FIELD

A welding method involving use of a bifurcated welding arbor in association with a relatively soft metal contact, such as a silver contact, wherein the welding action usually causes a center ridge to be formed in the contact between the weld arms of the arbor. Also, a new welding or securing technique is disclosed using an arbor for producing a ridge line or an uncontaminated center area in the end product.

BACKGROUND ART

In the formation of small electrical products, such as motor protectors, thermostats, and the like the industry has used silver contacts for many years to aid in obtaining good electrical properties in the products and to provide desirable, accurate control actions. These silver contacts become oxidized in use and they usually also have been microscopically corroded in the welding or riveting fabrication of the control. Such corrosion is objectionable.

Typical patent showing thermostats, such as the types to which the present invention relates are U.S. Pat. Nos. 3,721,934; 3,141,322 and 2,586,309. In such articles the contacts are secured in place by conventional weld techniques.

DISCLOSURE OF INVENTION

The general object of the present invention is to provide a new and improved welding method wherein the surface of the contact that provides make and break contact with an associated member has not been impregnated, contaminated or appreciably oxidized by the welding electrode used for attaching the contact to a carrier member.

Another object of the invention is to provide electrical contacts that have ridges provided thereon to facilitate make and break electrical contact with an associated electrical member and wherein the ridge portion of the contact is uncontaminated and provides an effective electrical contact medium with constant properties over a long service life.

Another object of the invention is to provide an uncontaminated center strip or area on the surface of a metal contact.

Yet a further object of the invention is to provide improved motor protectors thermostats and like electrical control items having effective, efficient lives with substantial uniform electrical properties.

These and other objects of the invention will become more apparent as a detailed description of the specification proceeds, are achieved: by a method of attaching electrical contacts onto a conductive body by use of metal contacts having an uncontaminated surface thereon including the steps of supporting spaced surface areas of the uncontaminated surface of the contact, forcing the opposite surface of the contact into engagement with the conductive body, and securing the contact to the conductive body but leaving a center area on the uncontaminated surface of the contact between the said spaced areas which center area has unoxidized uncontaminated metal on its exposed conductive surface.

BRIEF DESCRIPTION OF DRAWINGS

Reference now is made to the accompanying drawings, wherein.

When referring to corresponding members shown in the drawings and referred to in the specification, corresponding numerals are used to facilitate comparison therebetween.

BEST MODE FOR CARRYING OUT THE INVENTION

Figure 1:
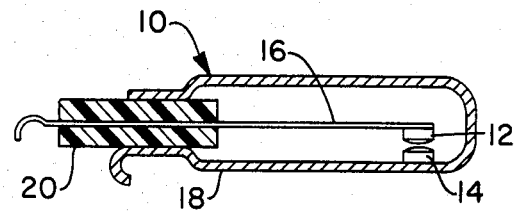
FIG. 1 is a vertical section through a thermostat having contacts therein positioned by the welding method of the invention.

Reference now is made to the details of the structure shown in the accompanying drawings, and FIG. 1 shows a cross-section of a thermostat 10 that includes a pair of contacts 12 and 14 positioned in opposed operative relationship with each other and wherein at least one of these contacts and the thermostat article made therefrom responds to the features of the present invention.

Specifically, in the thermostat 10, a bimetal strip 16 extends into the case 18 of the thermostat and is sealed in the case 18 by conventional sealing sleeve or means 20. At the free end of the bimetal strip 16, contact 12 is welded thereto while contact 14 is shown welded to the case 18 on the interior surface thereof in opposed relationship to the contact 12.

Figure 2:
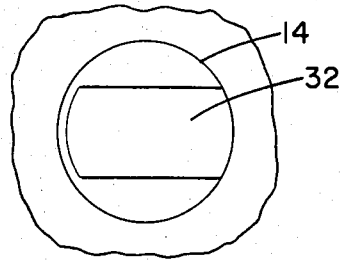
FIG. 2 is an enlarged fragmentary plan view of a contact of the thermostat of FIG. 1.
Figure 3:
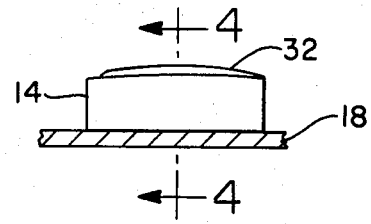
FIG. 3 is a side elevation of the contact of FIG. 2.
Figure 5:
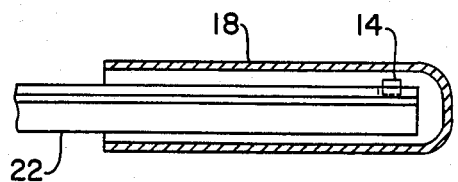
FIG. 5 is a fragmentary vertical section showing the positioning of a contact on a weld arbor and positioned within a case preparatory to attachment thereto.
Figure 4:
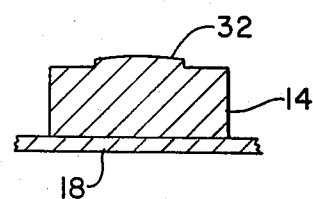
FIG. 4 is a vertical section taken through the contact of FIG. 3 on line 4—4 thereof.

FIGS. 2 and 5 show how a contact, such as the contact 12 is secured in position within the case and thus a weld arbor 22 is shown and it extends into the case 18 for securing a contact thereto. The end of the arbor shown is bifurcated and it includes a recess 26 on the surface shown uppermost in FIG. 2. Legs 24 and 25 of the arbor extend the height of the arbor at this welding end of the member and the contact 12 is received in the recess 26 usually adjacent the inner end thereof. The recess is shallower than the contact so that the contact will protrude above the arbor. This contact 12 is of the type used in many instances in making thermostats, motor protectors and the like wherein the contact is formed from substantially pure unoxidized silver. A base surface of the contact is thus exposed for bearing on the interior surface of the case.

Figure 6:
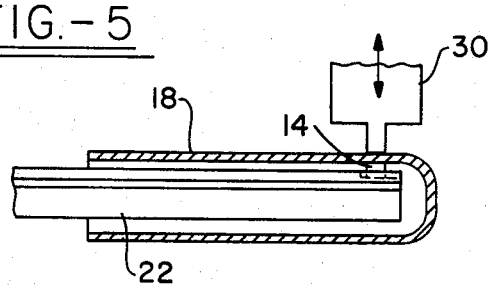
FIG. 6 is a vertical section showing the next tep of welding the contact to the interior surface of the metal case of FIG. 5.
Figure 11:
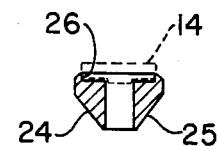
FIG. 11 is a vertical section taken on line 11—11 of FIG. 10.

FIG. 6 shows that a weld arbor 30 is in engagement with the outer surface of the case 18 and is directly opposed to the base surface of the contact 14 as positioned. Thus, the arbor 22 brings the base surface of the contact into engagement with the case and welding current is then caused to flow between the arbor 22, the contact 14, the case wall 18 and the arbor 30. Some slight weld pressure is exerted on the contact at this time by the legs 24 and 25 of the arbor and the contact is welded to the case.

FIG. 2 shows a fragmentary enlarged plan of part of the thermostat of FIG. 1 and particularly of the contact 14. A feature of the invention that an upstanding rib 32 is formed on the contact by the weld action provided and the size or height of the rib is controlled by the welding conditions and composition of the contact. This rib 32 normally extends across a diameter of the contact and it may decrease slightly in height adjacent diametrically opposed ends thereof. However, such rib 32 has been produced by the pressure and heat of weld action and by the legs 24 and 25 of the arbor during welding. This metal forming the rib 32 has not been contacted at all during the welding and hence, the contact will retain a pure silver unoxidized, uncontaminated surface on the rib since the contacts are made from pure unoxidized silver or other pure metals, and only current carrying surfaces of the contact become oxidized during the welding.

Figure 10:
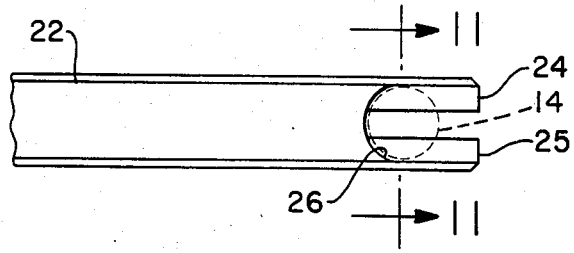
FIG. 10 is a plan view of a portion of a weld arbor of the invention.
Figure 7:
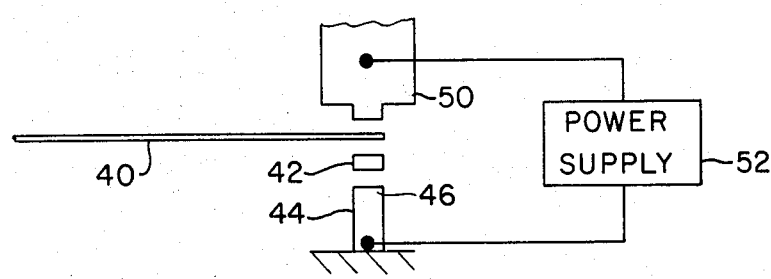
FIG. 7 is a diagrammatic view of welding circuit and associated means for welding a contact to a member such as a bimetal strip.
Figure 8:
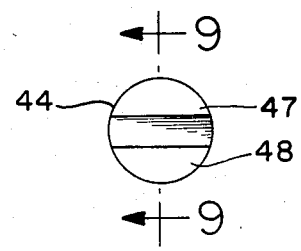
FIG. 8 is a plan view of the lower weld arbor of FIG. 7.
Figure 9:
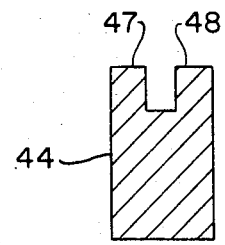
FIG. 9 is a vertical section taken on line 9—9 of the weld arbor of FIG. 8.

When a contact of the invention is to be secured to any type of conductive body, apparatus more or less as diagrammatically shown in FIG. 7, can be used for the welding action of the invention. In this instance, a bimetal strip i.e., conductive body 40 is shown and a contact 42, like the contact 12 is to be secured to one surface of the strip 40. Thus, a base arbor 44 which may be of cylindrical shape and have a bifurcated upper end 46 with legs 47 and 48 is provided. A top arbor 50 is positioned in opposed operative relationship with the arbor 44 and one of these arbors is movably positioned so that the arbors can be brought into operative engagement with the bimetal strip 40 and contact 42 therehetween. Then when all members are brought into contact, power supply 52 is actuated for desired weld action. This weld action provides, again, as in the prior embodiment of the invention, a contact that has a center rib thereon like the rib 32 and wherein such portion of the contact and its surface has not been contaminated by nor been involved in the weld action. If necessary, some type of a support surface, rib, or recess could be provided on the base weld arbor 44 to have it aid in centering a contact thereon and thus, the top surface could be like the recessed top surface of the arbor 22. A typically elongate arbor 22 is shown in FIG. 10 and these parallel spaced leg portions of the arbor at its inner end thereof readily position a contact for the weld action of the invention.

Figure 12:
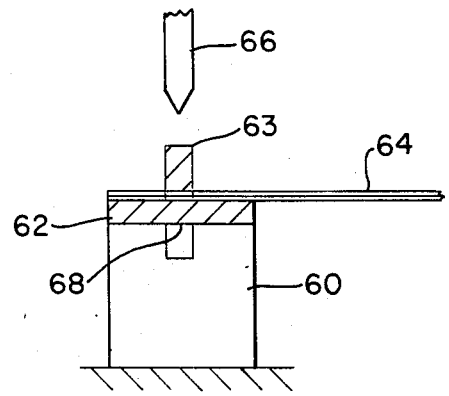
FIG. 12 is a vertical section through a riveted contact assembly that is a modification of the invention.

FIG. 12 shows a further securing method for obtaining a contact with an uncontaminated metal surface. A rivet arbor 60, like the arbor 44, is used to support a pure metal or metal alloy contact 62. This contact has a tang 63 extending therefrom through a hole in a bimetal strip 64 or other metal object to which the contact is to be secured. A spreader tool or punch 66 is forcibly brought into contact with the stem or tang 63 to upset the metal and tightly secure the contact 62 to its conductive carrier 64. The pure metal surface of the contact 62 including a center area 68 thereof extending across the contact hence has not been worked or contaminated in any manner by the rivet action, and microscopic contamination, as obtained in riveting and welding actions is avoided. Such center area 68 is not supported during the rivet action and hence a shallow raised rib may be produced at such center area depending on the contact material used, the metal working pressure etc.

From the foregoing it will be seen that a novel and improved welding method and apparatus has been disclosed for small electrical articles and especially where controlled resistance is desired in the articles. The contacts in the control articles in the invention have minimal resistance and will provide long service lives with no changes in the resistance or in functioning over some thousands of operative cycles. The thickness of the center ribs on the contact can be controlled by the length of the weld current passed and by the welding pressures and by the type of welder design. This improved securing method of the invention can be used to position contacts or other members on any other type of a conductive body and provide a center contact area with unoxidized metal thereon.

When two contacts are positioned in opposed relationship as shown in FIG. 1, the raised center ribs on these contacts can be positioned parallel to each other, usually to provide best contact therebetween. However, if desired, the center ribs could be positioned in 90° spaced relationship to each other and still have good contact engagement between the center raised contact areas of the ribs, or only one contact may have a rib, or uncontaminated surface area thereon. Thus, it is believed that the objects of the invention have been achieved and that improved, accurate electrical controls can be provided and which controls would have a good operative service life.

While one complete embodiment of the invention has been disclosed herein, it will be appreciated that modification of this particular embodiment of the invention may be resorted to without departing from the scope of the invention.

What is claimed is:

1. A thermostat, motor protector or the like including:
    a case;
    a bimetal strip extending into said case as a cantilever and having a hole formed in the cantilever part thereof;
    a metal contact member within said case on said strip for making and breaking an electrical circuit; and
    said contact member having an uncontaminated center area extending across its contact surface,
    said contact member being made from pure unoxidized, uncontaminated metal, and said contact has a tang extending through said hole to secure said contact member to said strip.

2. A thermostat, motor protector or the like including:
    a case;
    a bimetal strip extending into said case as a cantilever;
    cooperating contact members within said case for making and breaking an electrical circuit, one of said contact members being secured to said bimetal strip; and
    at least one of said contact member having a rib extending across its contact surface,
    said ribbed contact member being made from pure unoxidized silver, and the surface of said rib comprises pure unoxidized silver, where the ribbed contact member is secured in place in the unit by welding and no electrical contact is made with the surface of the rib during the welding.

* * * * *